US011417344B2

(12) United States Patent
Doi

(10) Patent No.: US 11,417,344 B2
(45) Date of Patent: Aug. 16, 2022

(54) INFORMATION PROCESSING METHOD, INFORMATION PROCESSING DEVICE, AND RECORDING MEDIUM FOR DETERMINING REGISTERED SPEAKERS AS TARGET SPEAKERS IN SPEAKER RECOGNITION

(71) Applicant: Panasonic Intellectual Property Corporation of America, Torrance, CA (US)

(72) Inventor: Misaki Doi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 127 days.

(21) Appl. No.: 16/658,769

(22) Filed: Oct. 21, 2019

(65) Prior Publication Data

US 2020/0135211 A1 Apr. 30, 2020

(30) Foreign Application Priority Data

Oct. 24, 2018 (JP) ............................ JP2018-200354

(51) Int. Cl.
*G10L 17/22* (2013.01)
*G10L 17/06* (2013.01)
(Continued)

(52) U.S. Cl.
CPC .............. *G10L 17/22* (2013.01); *G10L 17/02* (2013.01); *G10L 17/04* (2013.01); *G10L 17/06* (2013.01)

(58) Field of Classification Search
CPC ......... G10L 17/22; G10L 17/06; G10L 17/02; G10L 17/04
(Continued)

(56) References Cited

U.S. PATENT DOCUMENTS

2012/0239400 A1* 9/2012 Koshinaka .............. G10L 17/16 704/E17.004
2016/0098993 A1* 4/2016 Yamamoto ............ G10L 15/075 704/234

(Continued)

FOREIGN PATENT DOCUMENTS

JP 2016-75740 5/2016

OTHER PUBLICATIONS

Najim Dehak, et al., "Front-End Factor Analysis for Speaker Verification", IEEE Transactions on Audio, Speech, and Language Processing, vol. 19, No. 4, May 2011, pp. 788-798.

*Primary Examiner* — Edwin S Leland, III
(74) *Attorney, Agent, or Firm* — Wenderoth, Lind & Ponack, L.L.P.

(57) ABSTRACT

The information processing method in the present disclosure is performed as below. At least one speech segment is detected from speech input to a speech input unit. A first feature quantity is extracted from each speech segment detected, the first feature quantity identifying a speaker whose voice is contained in the speech segment. The first feature quantity extracted is compared with each of second feature quantities stored in storage and identifying the respective voices of registered speakers who are target speakers in speaker recognition. The comparison is performed for each of consecutive speech segments, and under a predetermined condition, among the second feature quantities stored in the storage, at least one second feature quantity whose similarity with the first feature quantity is less than or equal to a threshold is deleted, thereby removing the at least one registered speaker identified by the at least one second feature quantity.

11 Claims, 9 Drawing Sheets

(51) Int. Cl.
*G10L 17/02* (2013.01)
*G10L 17/04* (2013.01)

(58) Field of Classification Search
USPC .......................................................... 704/246
See application file for complete search history.

(56) References Cited

U.S. PATENT DOCUMENTS

| | | | | |
|---|---|---|---|---|
| 2018/0082689 | A1* | 3/2018 | Khoury | H04M 1/271 |
| 2018/0277121 | A1* | 9/2018 | Pearce | G10L 15/04 |
| 2018/0342251 | A1* | 11/2018 | Cohen | G06F 16/784 |
| 2019/0115032 | A1* | 4/2019 | Lesso | G10L 25/48 |
| 2019/0311715 | A1* | 10/2019 | Pfeffinger | G06F 3/167 |
| 2020/0135211 | A1* | 4/2020 | Doi | G10L 17/06 |
| 2020/0160846 | A1* | 5/2020 | Itakura | G10L 15/14 |
| 2020/0194006 | A1* | 6/2020 | Grancharov | G10L 17/04 |
| 2020/0327894 | A1* | 10/2020 | Doi | G06F 21/31 |
| 2021/0056955 | A1* | 2/2021 | Doi | G10L 17/04 |

* cited by examiner

INFORMATION PROCESSING METHOD, INFORMATION PROCESSING DEVICE, AND RECORDING MEDIUM FOR DETERMINING REGISTERED SPEAKERS AS TARGET SPEAKERS IN SPEAKER RECOGNITION

CROSS REFERENCE TO RELATED APPLICATION

This application claims the benefit of priority of Japanese Patent Application Number 2018-200354 filed on Oct. 24, 2018, the entire content of which is hereby incorporated by reference.

BACKGROUND

1. Technical Field

The present disclosure relates to an information processing method, an information processing device, and a recording medium and, in particular, to an information processing method, an information processing device, and a recording medium for determining registered speakers as target speakers in speaker recognition.

2. Description of the Related Art

Speaker recognition is a technique to identify a speaker from the characteristics of their voice by using a computer.

For instance, a technique of improving the accuracy of speaker recognition is proposed in Japanese Unexamined Patent Application Publication No. 2016-075740. In the technique disclosed in Japanese Unexamined Patent Application Publication No. 2016-075740, it is possible to improve the accuracy of speaker recognition by correcting a feature quantity for recognition representing the acoustic features of a human voice, on the basis of acoustic diversity representing the degree of variations in the kinds of sounds contained in a speech signal.

SUMMARY

For instance, when identifying a speaker in a conversation in a meeting, speakers are, for instance, preregistered, thereby clarifying participants in the meeting before performing speaker recognition. However, even when using the technique proposed in Japanese Unexamined Patent Application Publication No. 2016-075740, presence of many speakers to be identified decreases the accuracy of speaker recognition. This is because the larger the number of registered speakers, the higher the possibility of speaker misidentification.

The present disclosure has been made to address the above problem, and an objective of the present disclosure is to provide an information processing method, an information processing device, and a recording medium that are capable of providing improved accuracy of speaker recognition.

An information processing method according to an aspect of the present disclosure is an information processing method performed by a computer. The information processing method includes: detecting at least one speech segment from speech input to a speech input unit; extracting, from each of the at least one speech segment, a first feature quantity identifying a speaker whose voice is contained in the speech segment; comparing the first feature quantity extracted and each of second feature quantities stored in storage and identifying respective voices of registered speakers who are target speakers in speaker recognition; and determining registered speakers by performing the comparison for each of consecutive speech segments detected in the detecting and, under a predetermined condition, deleting, from the storage, at least one second feature quantity having a degree of similarity less than or equal to a threshold among the second feature quantities stored in the storage, to remove at least one registered speaker identified by the at least one second feature quantity, the degree of similarity being a degree of similarity with the first feature quantity.

It should be noted that a comprehensive aspect or specific aspects may be realized by a system, a method, an integrated circuit, a computer program, and a recording medium such as computer-readable CD-ROM or may be realized by any combinations of a system, a method, an integrated circuit, a computer program, and a recording medium.

The accuracy of speaker recognition can be improved by using, for example, the information processing method in the present disclosure.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
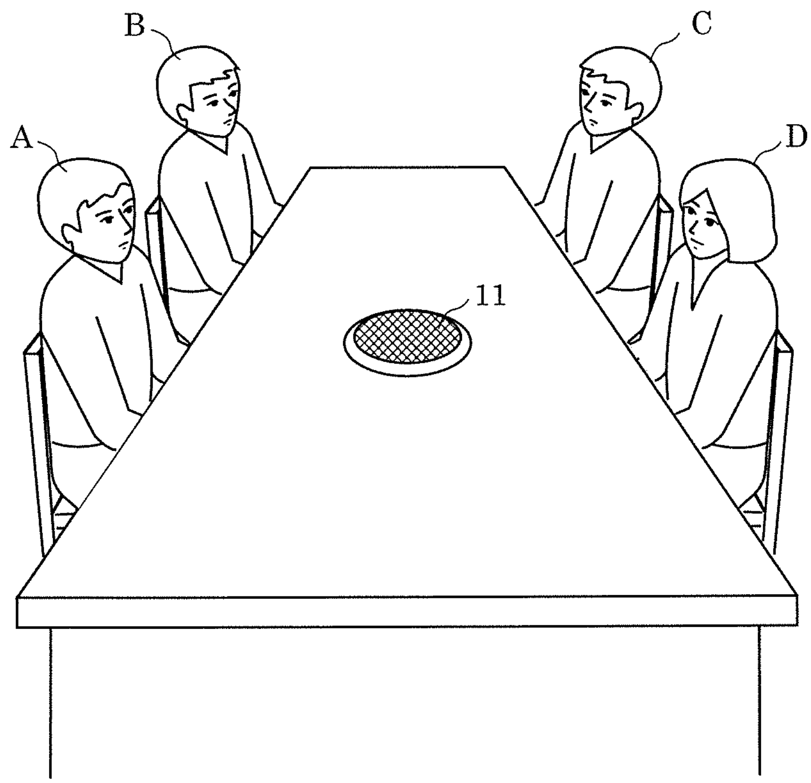
FIG. 1 illustrates an example of a scene in which a registered speaker estimation system according to Embodiment 1 is used.

Underlying Knowledge Forming the Basis of the Present Disclosure

For instance, when identifying a speaker in a conversation in a meeting, conventionally, speakers are, for instance, preregistered, thereby clarifying participants in the meeting before performing speaker recognition. However, there is a tendency that the larger the number of registered speakers, the higher the possibility of speaker misidentification, resulting in decreased accuracy of speaker recognition. That is, presence of many speakers to be identified decreases the accuracy of speaker recognition.

Meanwhile, it is empirically known that some participants speak fewer times in a meeting with many participants. This leads to the conclusion that it is not necessary to consider all the participants as constant target speakers in speaker recognition. That is, by choosing appropriate registered speakers, it is possible to suppress a decrease in the accuracy of speaker recognition, resulting in improved accuracy of speaker recognition.

An information processing method according to an aspect of the present disclosure is an information processing method performed by a computer. The information processing method includes: detecting at least one speech segment from speech input to a speech input unit; extracting, from each of the at least one speech segment, a first feature quantity identifying a speaker whose voice is contained in the speech segment; comparing the first feature quantity extracted and each of second feature quantities stored in storage and identifying respective voices of registered speakers who are target speakers in speaker recognition; and determining registered speakers by performing the comparison for each of consecutive speech segments detected in the detecting and, under a predetermined condition, deleting, from the storage, at least one second feature quantity having a degree of similarity less than or equal to a threshold among the second feature quantities stored in the storage, to remove at least one registered speaker identified by the at least one second feature quantity, the degree of similarity being a degree of similarity with the first feature quantity.

According to the aspect, a conversation is evenly divided into segments, a feature quantity in speech is extracted from each segment, and the comparison is repeated, which enables removal of a speaker who does not have to be identified. Thus, the accuracy of speaker recognition can be improved.

For instance, in the determining, as a result of the comparison, when degrees of similarity between the first feature quantity and all the second feature quantities stored in the storage are less than or equal to the threshold, the storage may store the first feature quantity as a feature quantity identifying a voice of a new registered speaker.

For instance, in the determining, when the second feature quantities stored in the storage include a second feature quantity having a degree of similarity higher than the threshold, the second feature quantity having a degree of similarity higher than the threshold may be updated to a feature quantity including the first feature quantity and the second feature quantity having a degree of similarity higher than the threshold, to update information on a registered speaker identified by the second feature quantity having a degree of similarity higher than the threshold and stored in the storage, the degree of similarity being a degree of similarity with the first feature quantity.

For instance, the storage may pre-store the second feature quantities.

For instance, the information processing method may further include registering target speakers before the computer performs the determining, by (i) instructing each of target speakers to utter first speech and inputting the respective first speech to the speech input unit, (ii) detecting first speech segments from the respective first speech, (iii) extracting, from the first speech segments, feature quantities in speech identifying the respective target speakers, and (iv) storing the feature quantities in the storage as the second feature quantities.

For instance, in the determining, as the predetermined condition, the comparison may be performed a total of m times for the consecutive speech segments, where m is an integer greater than or equal to 2, and as a result of the comparison performed m times, when at least one second feature quantity having a degree of similarity less than or equal to the threshold is included, at least one registered speaker identified by the at least one second feature quantity may be removed, the degree of similarity being a degree of similarity with the first feature quantity extracted in each of the consecutive speech segments.

For instance, in the determining, as the predetermined condition, the comparison may be performed for a predetermined period, and as a result of the comparison performed for the predetermined period, when at least one second feature quantity having a degree of similarity less than or equal to the threshold is included, at least one registered speaker identified by the at least one second feature quantity may be removed, the degree of similarity being a degree of similarity with the first feature quantity.

For instance, in the determining, when the storage stores, as the second feature quantities, second feature quantities identifying two or more respective registered speakers who are target speakers in speaker recognition, at least one registered speaker identified by the at least one second feature quantity may be removed.

For instance, in the detecting, speech segments may be detected consecutively in a time sequence from speech input to the speech input unit.

For instance, in the detecting, speech segments may be detected at predetermined intervals from speech input to the speech input unit.

An information processing device according to an aspect of the present disclosure includes: a detector that detects at least one speech segment from speech input to a speech input unit; a feature quantity extraction unit that extracts, from each of the at least one speech segment, a first feature quantity identifying a speaker whose voice is contained in the speech segment; a comparator that compares the first feature quantity extracted and each of second feature quantities stored in storage and identifying respective registered speakers who are target speakers in speaker recognition; and a registered speaker determination unit that performs the comparison for each of consecutive speech segments detected in the detecting and, under a predetermined condition, removes at least one registered speaker identified by at least one second feature quantity having a degree of similarity less than or equal to a threshold among the second feature quantities stored in the storage, the degree of similarity being a degree of similarity with the first feature quantity.

A recording medium according to an aspect of the present disclosure is used to cause a computer to perform an information processing method. The information processing method includes; detecting at least one speech segment from speech input to a speech input unit; extracting, from each of the at least one speech segment, a first feature quantity identifying a speaker whose voice is contained in the speech segment; comparing the first feature quantity extracted and each of second feature quantities stored in storage and identifying respective registered speakers who are target speakers in speaker recognition; and determining registered speakers by performing the comparison for each of consecutive speech segments detected in the detecting and, under a predetermined condition, removing at least one registered speaker identified by at least one second feature quantity having a degree of similarity less than or equal to a threshold among the second feature quantities stored in the storage, the degree of similarity being a degree of similarity with the first feature quantity.

It should be noted that a comprehensive aspect or specific aspects may be realized by a system, a method, an integrated circuit, a computer program, or a recording medium such as computer-readable CD-ROM or may be realized by any combinations of a system, a method, an integrated circuit, a computer program, and a recording medium.

Hereinafter, the embodiments of the present disclosure are described with reference to the Drawings. Both embodiments described below represent specific examples in the present disclosure. Numerical values, shapes, structural elements, steps, the order of the steps, and others described in the embodiments below are mere examples and are not intended to limit the present disclosure. In addition, among the structural elements described in the embodiments below, the structural elements not recited in the independent claims representing superordinate concepts are described as optional structural elements. Details described in both embodiments can be combined.

Embodiment 1

Hereinafter, with reference to the Drawings, information processing and other details in Embodiment 1 are described.

Registered Speaker Estimation System 1

Figure 2:
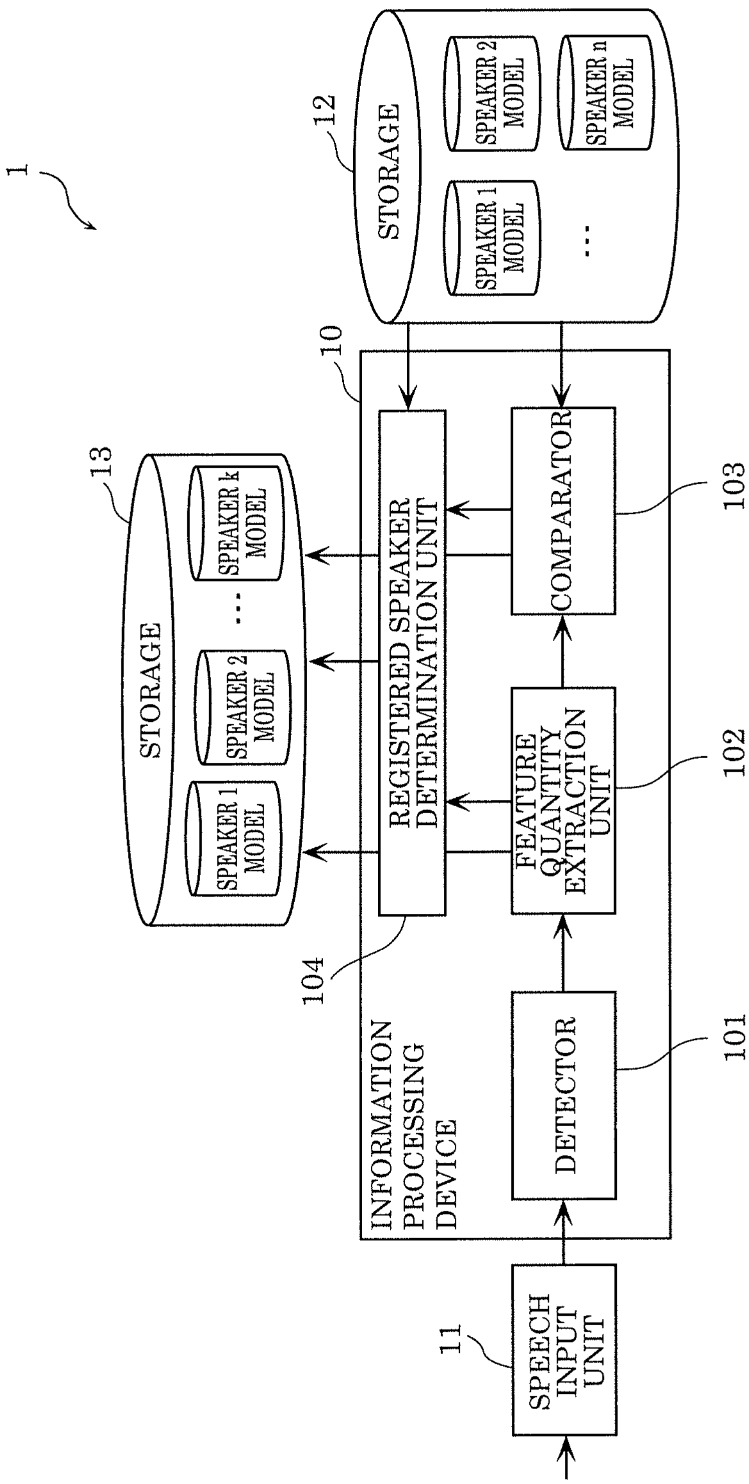
FIG. 2 is a block diagram illustrating a configuration example of the registered speaker estimation system according to Embodiment 1.

FIG. 1 illustrates an example of a scene in which registered speaker estimation system 1 according to Embodiment 1 is used. FIG. 2 is a block diagram illustrating a configuration example of registered speaker estimation system 1 according to Embodiment 1.

As illustrated in FIG. 1, registered speaker estimation system 1 according to Embodiment 1 (not illustrated) is used in, for example, a meeting with four participants illustrated as speakers A, B, C, and D. It should be noted that participants in a meeting are not limited to four people. As long as two or more people participate in a meeting, the number of participants may be any numbers. In the example illustrated in FIG. 1, a meeting microphone is installed as speech input unit 11 of registered speaker estimation system 1.

As illustrated in FIG. 2, registered speaker estimation system 1 according to Embodiment 1 includes information processing device 10, speech input unit 11, storage 12, and storage 13. Hereinafter, each of the structural elements is described.

Speech Input Unit 11

Speech input unit 11 is, for example, a microphone, and speech produced by speakers or a speaker is input to speech input unit 11. Speech input unit 11 converts the input speech into a speech signal and inputs the speech signal to information processing device 10.

Information Processing Device 10

Information processing device 10 is, for example, a computer including a processor (microprocessor), memory, and communication interfaces. Information processing device 10 may work as part of a server, or a part of information processing device 10 may work as part of a cloud server. Information processing device 10 chooses registered speakers to be identified.

As illustrated in FIG. 2, information processing device 10 in Embodiment 1 includes detector 101, feature quantity extraction unit 102, comparator 103, and registered speaker determination unit 104. It should be noted that information processing device 10 may further include storage 13 and storage 12. However, storage 13 and storage 12 are not essential elements.

Detector 101

Figure 3:
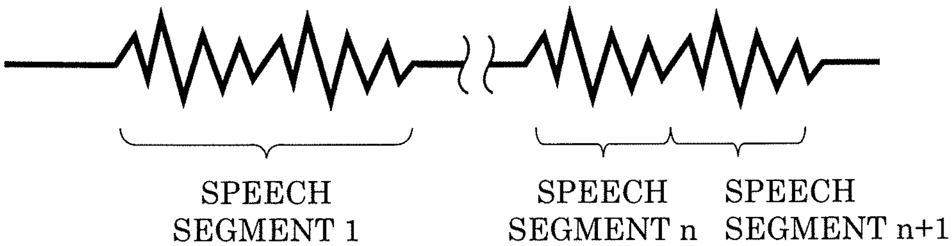
FIG. 3 illustrates an example of speech segments detected by a detector according to Embodiment 1.

FIG. 3 illustrates an example of speech segments detected by detector 101 according to Embodiment 1.

Detector 101 detects a speech segment from speech input to speech input unit 11. More specifically, by a speech-segment detection technique, detector 101 detects a speech segment containing an uttered voice from a speech signal received from speech input unit 11. It should be noted that speech-segment detection is a technique to distinguish a segment containing voice from a segment not containing voice in a signal containing voice and noise. Typically, a speech signal output by speech input unit 11 contains voice and noise.

In Embodiment 1, for example, as illustrated in FIG. 3, detector 101 detects speech segments 1 to n+1 from a speech signal received from speech input unit 11, speech segments 1 to n+1 being obtained by evenly dividing speech into portions. For instance, each of speech segments 1 to n+1 continues for two seconds. It should be noted that detector 101 may consecutively detect speech segments in a time sequence from speech input to speech input unit 11. In this instance, information processing device 10 can choose appropriate registered speakers in real time. It should be noted that detector 101 may detect speech segments from speech input to speech input unit 11 at fixed intervals. In this instance, the fixed intervals may be set to, for example, two seconds. This enables information processing device 10 to choose appropriate registered speakers although not in real time, but according to the timing at which a speaker utters. This contributes to the reduction of costs in computation performed by information processing device 10.

Feature Quantity Extraction Unit 102

Feature quantity extraction unit 102 extracts, from a speech segment detected by detector 101, a first feature quantity identifying the speaker whose voice is contained in the speech segment. More specifically, feature quantity extraction unit 102 receives a speech signal into which speech has been converted and which has been detected by detector 101. That is, feature quantity extraction unit 102 receives a speech signal representing speech. Then, feature quantity extraction unit 102 extracts a feature quantity from the speech. A feature quantity is, for example, represented by a feature vector, or more specifically, an i-Vector for use in a speaker recognition method. It should be noted that a feature quantity is not limited to such a feature vector.

When a feature quantity is represented by an i-Vector, feature quantity extraction unit 102 extracts feature quantity w referred to as i-Vector and obtained by the expression: $M=m+Tw$, as a unique feature quantity of each speaker.

Here, M in the expression denotes an input feature quantity representing a speaker. M can be expressed using, for example, the Gaussian mixture model (GMM) and a GMM super vector. According to the GMM approach, digit sequences referred to as, for example, mel frequency cepstral coefficients (MFCCs) and obtained by analyzing the frequency spectrum of speech are represented by overlapping Gaussian distributions. In addition, m in the expression can be expressed using feature quantities obtained in the same way as M from the voices of many speakers. The GMM for m is referred to as universal background model (UBM). T in the expression denotes a base vector capable of covering a feature-quantity space for a typical speaker obtained by the above expression: $M=m+Tw$.

Comparator 103

Comparator 103 compares a first feature quantity extracted by feature quantity extraction unit 102 and each of second feature quantities stored in storage 13 and identifying the respective voices of registered speakers who are target speakers in speaker recognition. Comparator 103 performs the comparison for each of consecutive speech segments.

In Embodiment 1, comparator 103 compares a feature quantity (first feature quantity) extracted by feature quantity extraction unit 102 from, for example, speech segment n detected by detector 101 and each of the second feature quantities of speaker 1 to k models stored in storage 13. Here, the speaker 1 model corresponds to the model of a feature quantity (second feature quantity) in speech (utterance) by the first speaker. Likewise, the speaker 2 model corresponds to the model of a feature quantity in speech by the second speaker, and the speaker k model corresponds to the model of a feature quantity in speech by the kth speaker. The same is applicable to the other speaker models. For instance, as illustrated by speakers A to D illustrated in FIG. 1, the first to the kth speakers are participants in, for example, a meeting.

As the comparison, comparator 103 calculates degrees of similarity between a first feature quantity extracted from, for example, speech segment n and the second feature quantities of the speaker models stored in storage 13. When each of a first feature quantity and a second feature quantity is represented by an i-Vector, each of the first feature quantity and the second feature quantity is represented by several-hundred digit sequences. In this instance, comparator 103 can perform simplified calculation by, for instance, cosine distance scoring disclosed in Dehak, Najim., et al. "Front-end factor analysis for speaker verification." *IEEE Transactions on Audio, Speech, and Language Processing* 19, no. 4 (2011): 788-798, and obtain degrees of similarity. When a high degree of similarity is obtained by cosine distance scoring, the degree of similarity has a value close to 1, and when a low degree of similarity is obtained by cosine distance scoring, the degree of similarity has a value close to −1. It should be noted that a similarity-degree calculation method is not limited to the above method.

Likewise, comparator 103 compares a first feature quantity extracted from, for example, speech segment n+1 detected by detector 101 and each of the second feature quantities of the speaker 1 to k models stored in storage 13. Thus, comparator 103 repeatedly performs the comparison by comparing, for each speech segment, a first feature quantity and each of the second feature quantities of the speaker models representing respective registered speakers and stored in storage 13.

It should be noted that as the comparison, comparator 103 may calculate degrees of similarity between a first feature quantity extracted by feature quantity extraction unit 102 and second feature quantities for respective registered speakers, stored in storage 12. In the example in FIG. 2, as the comparison, comparator 103 calculates degrees of similarity between a first feature quantity extracted by feature quantity extraction unit 102 from, for example, speech segment n detected by detector 101 and the second feature quantities of the speaker 1 to n models stored in storage 12. Likewise, as the comparison, comparator 103 calculates degrees of similarity between a first feature quantity extracted from, for example, speech segment n+1 detected by detector 101 and the second feature quantities of the speaker 1 to n models stored in storage 12. Thus, comparator 103 repeatedly performs the comparison by comparing, for each speech segment, a first feature quantity and each of the second feature quantities of the speaker models representing the respective registered speakers and stored in storage 12.

Registered Speaker Determination Unit 104

Under a predetermined condition, registered speaker determination unit 104 deletes, from storage 13, at least one second feature quantity whose similarity with a first feature quantity is less than or equal to a threshold among second feature quantities stored in storage 13, thereby removing the at least one registered speaker identified by the at least one second feature quantity. As a predetermined condition, comparator 103 may perform the comparison a total of m times for consecutive speech segments (comparison is performed per speech segment), where m is an integer greater than or equal to 2. As a result of the comparison performed m times, when at least one second feature quantity whose similarity with a first feature quantity extracted in each of the consecutive speech segments is less than or equal to a threshold is stored, registered speaker determination unit 104 may remove the at least one registered speaker identified by the at least one second feature quantity. That is, as a predetermined condition, comparator 103 may perform the comparison for a fixed period. As a result of the comparison performed for the fixed period, when at least one second feature quantity whose similarity with a first feature quantity is less than or equal to a threshold is stored, registered speaker determination unit 104 may remove the at least one registered speaker identified by the at least one second feature quantity. In other words, as a result of the comparison repeatedly performed by comparator 103, when a speech segment has not appeared in a specified number of consecutive speech segments or when a speech segment has not appeared for a fixed period, the speech segment containing a second feature quantity for each of at least one registered speaker among the registered speakers to be identified, registered speaker determination unit 104 may remove the at least one registered speaker from storage 13.

It should be noted that when storage 13 stores second feature quantities identifying two or more respective registered speakers who are target speakers in speaker recognition, registered speaker determination unit 104 may remove the at least one registered speaker identified by the at least one second feature quantity. That is, when registered speaker determination unit 104 refers to storage 13, when storage 13 stores two or more registered speakers to be identified, registered speaker determination unit 104 may then perform the removal.

In addition, when degrees of similarity between a first feature quantity and all the second feature quantities stored in storage 13 are less than or equal to the threshold, registered speaker determination unit 104 may then store the first feature quantity in storage 13 as a feature quantity identifying the voice of a new registered speaker to be identified. For instance, the following considers the case where as a result of the comparison, degrees of similarity between a first feature quantity extracted from a speech segment by feature quantity extraction unit 102 and all the second feature quantities, stored in storage 13, for respective registered speakers to be identified are less than or equal to a specified value. In this case, by storing the first feature quantity in storage 13 as a second feature quantity, it is possible to add the speaker identified by the first feature quantity as a new registered speaker. It should be noted that when storage 12 stores a speaker model containing a second feature quantity identical to a first feature quantity extracted from a speech segment or a second feature quantity having a degree of similarity higher than a specified degree of similarity, registered speaker determination unit 104 may store the speaker model stored in storage 12 in storage 13 as a model for a new registered speaker to be identified. By performing the comparison, it is possible to determine whether storage 12 stores a speaker model containing a second feature quantity identical to a first feature quantity extracted from a speech segment or a second feature quantity having a degree of similarity higher than the specified degree of similarity.

When the second feature quantities stored in storage 13 include a second feature quantity whose similarity with a first feature quantity is higher than the threshold, registered speaker determination unit 104 may update the second feature quantity whose similarity with the first feature quantity is higher than the threshold to a feature quantity including the first feature quantity and the second feature quantity whose similarity with the first feature quantity is higher than the threshold. This updates information on the registered speaker identified by the second feature quantity whose similarity with the first feature quantity is higher than the threshold and that is stored in storage 13. That is, as a result of the comparison, when the second feature quantities for the respective registered speakers, stored in storage 13 include a second feature quantity whose similarity with a first feature quantity extracted from a speech segment by feature quantity extraction unit 102 is greater than a specified value, registered speaker determination unit 104 updates the second feature quantity. It should be noted that as a speaker model stored in storage 13, storage 13 may store a second feature quantity and a speech segment from which the second feature quantity has been extracted. In this instance, registered speaker determination unit 104 may store an updated speech segment in which a speech segment stored as a speaker model and a speech segment are combined and, as a second feature quantity of the speaker model, a feature quantity extracted from the updated speech segment.

Storage 12

Storage 12 is, for example, rewritable non-volatile memory such as a hard disk drive or a solid state drive and stores information on each of registered speakers. In Embodiment 1, as information on each of registered speakers, storage 12 stores speaker models for the respective registered speakers. Speaker models are for use in identifying respective registered speakers, and each speaker model represents the model of a feature quantity (second feature quantity) in speech (utterance) by a registered speaker. Storage 12 stores speaker models stored at least once in storage 13.

In the example in FIG. 2, storage 12 stores the first to nth speaker models. The first speaker model is the model of a second feature quantity in speech (utterance) by the first speaker. The second speaker model is the model of a second feature quantity in speech by the second speaker. The nth speaker model is the model of a second feature quantity in speech by the nth speaker. The same is applicable to the other speaker models.

Storage 13

Storage 13 is, for example, a rewritable-nonvolatile-memory storage medium such as a hard disk drive or a solid state drive and pre-stores second feature quantities. In Embodiment 1, storage 13 stores information on each of registered speakers to be identified. More specifically, as information on each of registered speakers to be identified, storage 13 stores speaker models for the respective registered speakers. That is, storage 13 stores the speaker models representing the respective registered speakers to be identified.

In the example in FIG. 2, storage 13 stores the speaker 1 to k models. The first speaker model is the model of a second feature quantity in speech (utterance) by the first speaker. The second speaker model is the model of a second feature quantity in speech by the second speaker. The kth speaker model is the model of a second feature quantity in speech by the kth speaker. The same is applicable to the other speaker models. The second feature quantities of these speaker models are pre-stored, that is, preregistered.

Operation by Information Processing Device 10

Next, operations performed by information processing device 10 having the above configuration are described.

Figure 4:
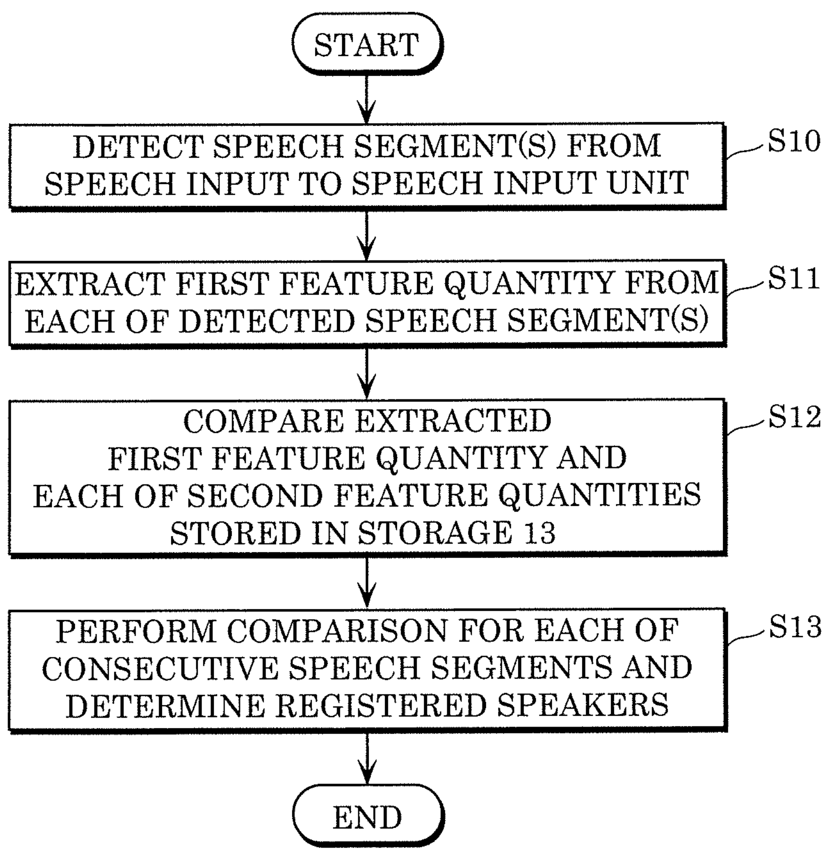
FIG. 4 is a flowchart illustrating the outline of operations performed by an information processing device according to Embodiment 1.

FIG. 4 is a flowchart illustrating the outline of the operations performed by information processing device 10 according to Embodiment 1.

Information processing device 10 detects at least one speech segment from speech input to speech input unit 11 (S10). Information processing device 10 extracts, from each of the at least one speech segment detected in step S10, a first feature quantity identifying the speaker whose voice is contained in the speech segment (S11). Information processing device 10 compares the first feature quantity extracted in step S11 and each of second feature quantities stored in storage 13 and identifying respective registered speakers who are target speakers in speaker recognition (S12). Information processing device 10 performs the comparison for each of consecutive speech segments and determines registered speakers (S13).

Figure 5:
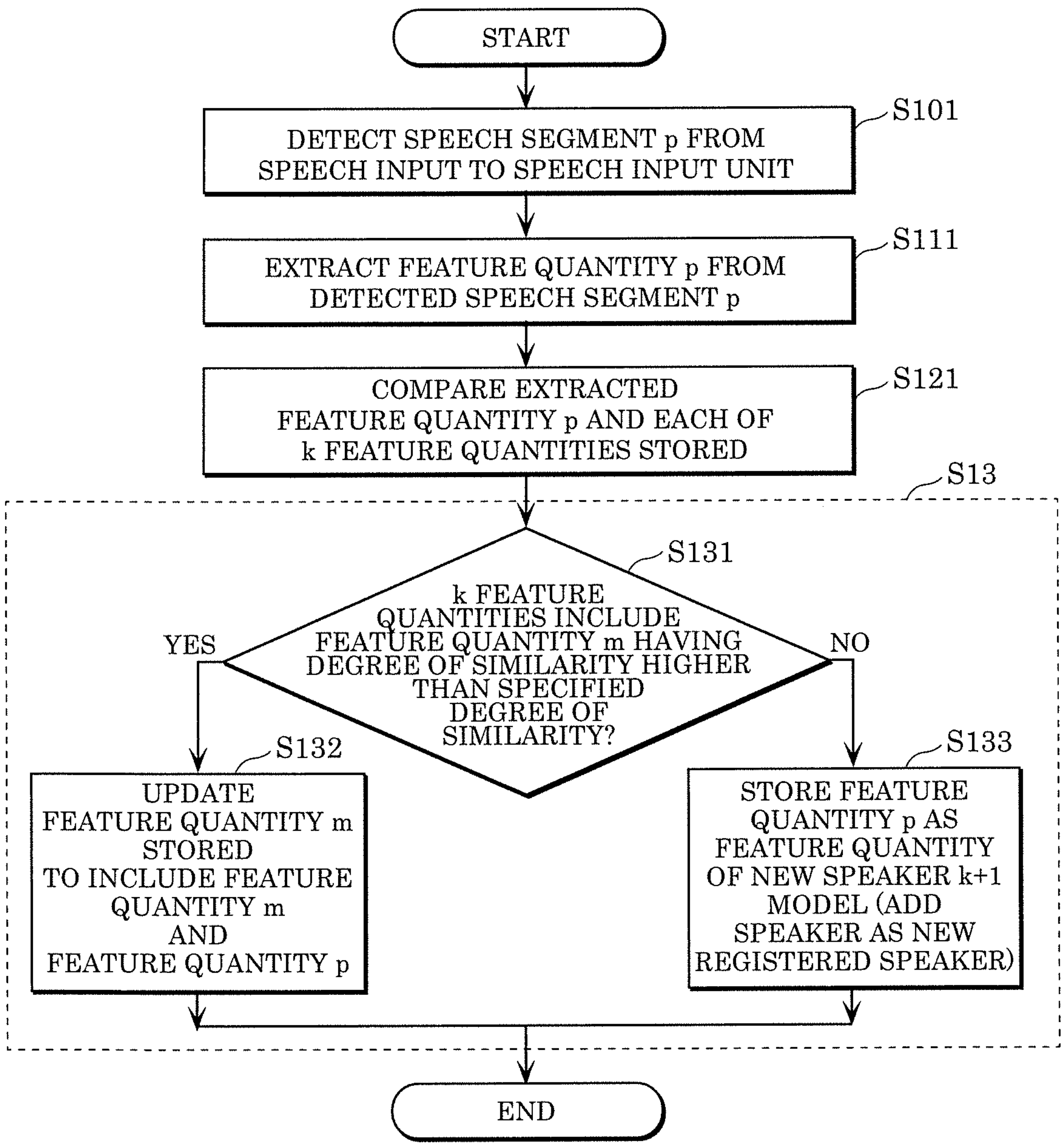
FIG. 5 is a flowchart illustrating a process in which the information processing device according to Embodiment 1 performs specific operations.
Figure 6:
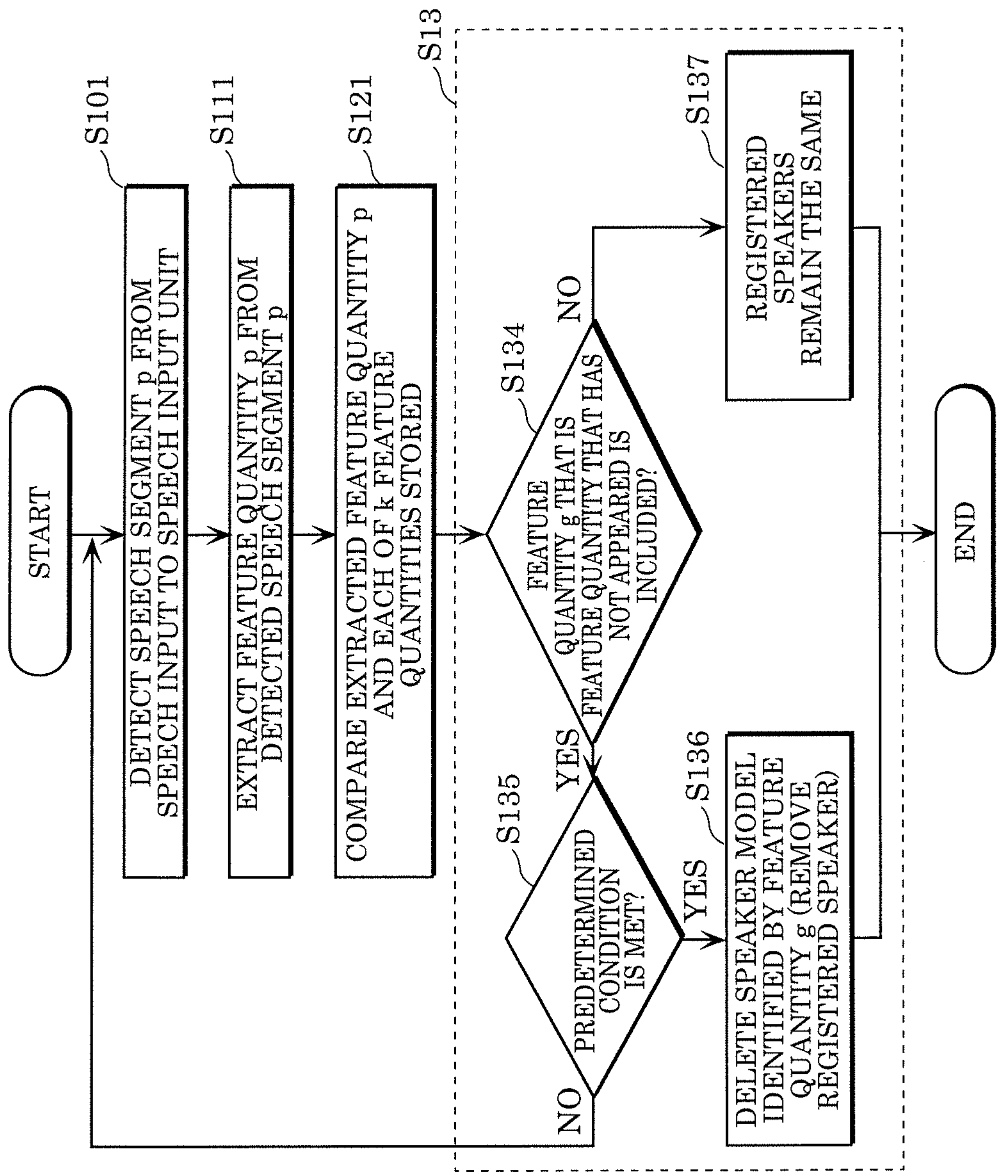
FIG. 6 is a flowchart illustrating another process in which the information processing device according to Embodiment 1 performs specific operations.

With reference to FIGS. 5 and 6, specific operations related to step S13 and other steps are described. FIG. 5 is a flowchart illustrating a process in which information processing device 10 according to Embodiment 1 performs the specific operations.

In step S10, for instance, information processing device 10 detects speech segment p from speech input to speech input unit 11 (S101).

In step S11, for instance, information processing device 10 extracts, from speech segment p detected in step S101, feature quantity p as a first feature quantity identifying a speaker (S111).

In step S12, information processing device 10 compares feature quantity p extracted in step S111 and each of k feature quantities for respective registered speakers who are target speakers in speaker recognition, the k feature quantities being the second feature quantities stored in storage 13, and k representing a number (S121).

In step S13, information processing device 10 determines whether the k feature quantities stored in storage 13 include a feature quantity having a degree of similarity higher than a specified degree of similarity (S131). That is, information processing device 10 determines whether the k feature quantities stored in storage 13 include feature quantity m whose similarity with feature quantity p extracted from speech segment p is higher than a threshold, that is, whether the k feature quantities stored in storage 13 include feature quantity m identical or almost identical to feature quantity p.

In step S131, when the k feature quantities stored in storage 13 include feature quantity m having a degree of similarity higher than the specified degree of similarity (Yes in S131), feature quantity m stored in storage 13 is updated to a feature quantity including feature quantity p and feature quantity m (S132). It should be noted that as a speaker m model representing the model of feature quantity m stored in storage 13, storage 13 may store speech segment m from which feature quantity m has been extracted, in addition to feature quantity m. In this instance, information processing device 10 may store speech segment m+p in which speech segment m and speech segment p are combined and, as the second feature quantity of the speaker m model, feature quantity m+p extracted from speech segment m+p.

Meanwhile, in step S131, when the k feature quantities stored in storage 13 do not include a feature quantity having a degree of similarity higher than the specified degree of similarity (No in S131), storage 13 stores feature quantity p as the second feature quantity of a new speaker k+1 model (S133). That is, as a result of the comparison, when the first feature quantity extracted from speech segment p is identical to none of the second feature quantities, stored in storage 13, for the respective registered speakers to be identified, information processing device 10 stores the first feature quantity in storage 13, thereby registering a new speaker to be identified.

In the process illustrated in FIG. 5, as a result of the comparison for each speech segment performed by information processing device 10, when the second feature quantities stored in storage 13 include a second feature quantity, whose similarity with a first feature quantity extracted from a speech segment is higher than the threshold (specified degree of similarity), for a registered speaker to be identified, the second feature quantity is updated to a feature quantity including the first feature quantity and the second feature quantity. Thus, by updating the second feature quantity, an amount of information of the second feature quantity is increased, resulting in improved accuracy of identifying a registered speaker by the second feature quantity, that is, improved accuracy of speaker recognition. In addition, in the process illustrated in FIG. 5, as a result of the comparison for each speech segment performed by information processing device 10, when storage 13 does not store a second feature quantity whose similarity with a first feature quantity extracted from a speech segment is higher than the threshold, information processing device 10 stores the first feature quantity in storage 13. Thus, it is possible to add a registered speaker as a new target speaker in speaker recognition, resulting in improved accuracy of speaker recognition. That is, even if the number of the registered speakers to be identified is decreased by processing described later, where necessary, it is possible to add a registered speaker again as a new target speaker in speaker recognition, resulting in improved accuracy of speaker recognition.

FIG. 6 is a flowchart illustrating another process in which information processing device 10 according to Embodiment 1 performs specific operations. The same reference symbols are assigned to the corresponding steps in FIGS. 5 and 6, and detailed explanations are omitted.

In step S13, information processing device 10 determines whether the k feature quantities stored in storage 13 include feature quantity g that is a feature quantity that has not appeared (S134). More specifically, through the comparison performed for speech segment p, information processing device 10 determines whether the k feature quantities stored in storage 13 include at least one second feature quantity whose similarity with the first feature quantity is less than or equal to the threshold, that is, whether the k feature quantities stored in storage 13 include feature quantity g.

In step S134, when feature quantity g, which is a feature quantity that has not appeared, is included (Yes in S134), whether a predetermined condition is met is determined (S135). In Embodiment 1, as a predetermined condition, information processing device 10 may perform the comparison a total of m times for consecutive speech segments (comparison is performed per speech segment), where m is an integer greater than or equal to 2. Through the comparison performed m times, information processing device 10 may determine whether feature quantity g is included. That is, as a predetermined condition, information processing device 10 may perform the comparison for a fixed period. Through the comparison performed for the fixed period, information processing device 10 may determine whether feature quantity g is included. In other words, information processing device 10 repeats the comparison and then determines whether a speech segment that has not appeared in a specified number of consecutive speech segments is present or whether a speech segment that has not appeared for a fixed period is present, the speech segment containing a second feature quantity, stored in storage 13, for each of at least one registered speaker among the registered speakers to be identified.

In step S135, when the predetermined condition is met (Yes in S135), by deleting feature quantity g from storage 13, the speaker model identified by feature quantity g is deleted from storage 13 (S136). Then, the processing ends. It should be noted that in step S135, when the predetermined condition is not met (No in S135), the processing returns to step S10, and information processing device 10 detects next speech segment p+1.

Meanwhile, in step S134, when feature quantity g, which is a feature quantity that has not appeared, is not included (No in S134), the pieces of information, stored in storage 13, on the registered speakers to be identified remain the same (S137). Then, the processing ends.

In the process illustrated in FIG. 6, information processing device 10 performs the comparison for each of consecutive speech segments. Under the predetermined condition, information processing device 10 deletes, from storage 13, at least one second feature quantity whose similarity with a first feature quantity (first feature quantities) is less than or equal to the threshold among the second feature quantities stored in storage 13. Thus, by removing a registered speaker who has not uttered under the predetermined condition, information processing device 10 can remove the speaker who does not have to be identified. Thus, it is possible to identify a speaker among registered speakers of appropriate numbers, for example, among current speakers, resulting in improved accuracy of speaker recognition.

Figure 7:
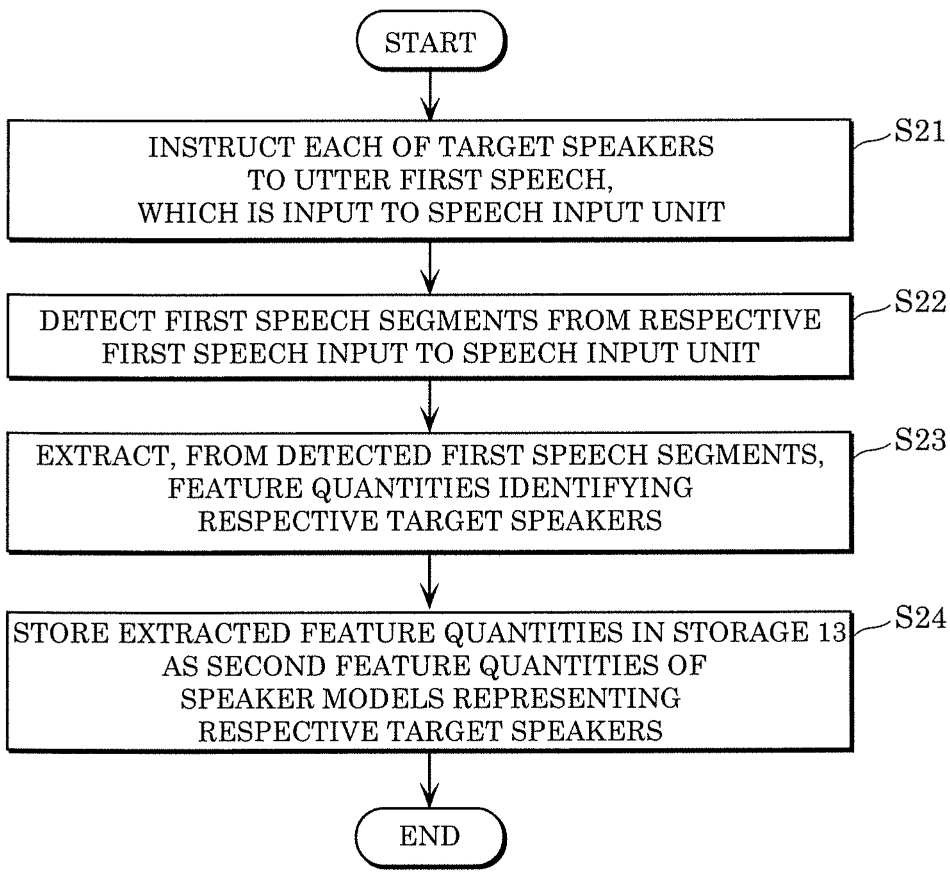
FIG. 7 is a flowchart illustrating a preregistration process according to Embodiment 1.

FIG. 7 is a flowchart illustrating a preregistration process according to Embodiment 1.

FIG. 7 illustrates a process performed before information processing device 10 performs the operations illustrated in FIGS. 5 and 6 in, for example, a meeting. Through the process illustrated in FIG. 7, storage 13 stores second feature quantities identifying the respective voices of registered speakers. It should be noted that preregistration may be performed by using information processing device 10 or by using a device different from information processing device 10 as long as the device includes detector 101 and feature quantity extraction unit 102.

First, each of target speakers to be registered, such as each participant in a meeting, is instructed to utter first speech, and the respective first speech is input to speech input unit 11 (S21). A computer causes detector 101 to detect first speech segments from the respective first speech input to speech input unit 11 (S22). The computer causes feature quantity extraction unit 102 to extract, from the first speech segments detected in step S22, feature quantities identifying the respective speakers who are the target speakers and have uttered the first speech (S23). As the second feature quantities of speaker models representing the respective target speakers, the computer stores, in storage 13, the feature quantities extracted in step S23 by feature quantity extraction unit 102 (S24).

In this way, through the preregistration process, it is possible to store, in storage 13, the second feature quantities of speaker models representing respective registered speakers, that is, respective speakers to be identified.

Advantageous Eddect, Etc.

As described above, by using, for example, information processing device 10 in Embodiment 1, a conversation is evenly divided into segments, a voice feature quantity is extracted from each segment, and the comparison is then repeated. By doing so, it is possible to remove a speaker who does not have to be identified, resulting in improved accuracy of speaker recognition.

Information processing device 10 in Embodiment 1 performs the comparison for each speech segment. When storage 13 stores a second feature quantity almost identical to a first feature quantity extracted from a speech segment, information processing device 10 updates the second feature quantity stored in storage 13 to a feature quantity including the first feature quantity and the second feature quantity. Thus, by updating the second feature quantity, an amount of information of the second feature quantity is increased, resulting in improved accuracy of identifying a registered speaker by the second feature quantity, that is, improved accuracy of speaker recognition.

In addition, as a result of the comparison for each speech segment, when storage 13 does not store a second feature quantity almost identical to a first feature quantity extracted from a speech segment, information processing device 10 in Embodiment 1 stores the first feature quantity in storage 13 as the feature quantity of a new speaker model representing a registered speaker to be identified. Thus, it is possible to add a registered speaker as a new target speaker in speaker recognition, resulting in improved accuracy of speaker recognition. That is, where necessary, it is possible to add a registered speaker as a new target speaker in speaker recognition, resulting in improved accuracy of speaker recognition.

In addition, under the predetermined condition, information processing device 10 in Embodiment 1 can remove a registered speaker who has not uttered, that is, a speaker who does not have to be identified. Accordingly, by removing a speaker who has not uttered, it is possible to identify a speaker among a decreased number of registered speakers (appropriate registered speakers), resulting in improved accuracy of speaker recognition.

Information processing device 10 in Embodiment 1 can choose appropriate registered speakers in this manner, thereby making it possible to suppress a decrease in the accuracy of speaker recognition and improve the accuracy of speaker recognition.

Embodiment 2

In Embodiment 1, storage 13 pre-sores the second feature quantities of speaker models representing respective registered speakers. However, second feature quantities do not necessarily have to be presorted. Before choosing registered speakers to be identified, information processing device 10 may store the second feature quantities of the speaker models representing the respective registered speakers in storage 13. Hereinafter, this case is described as Embodiment 2. It should be noted that the following description focuses on differences between Embodiments 1 and 2.

Figure 8:
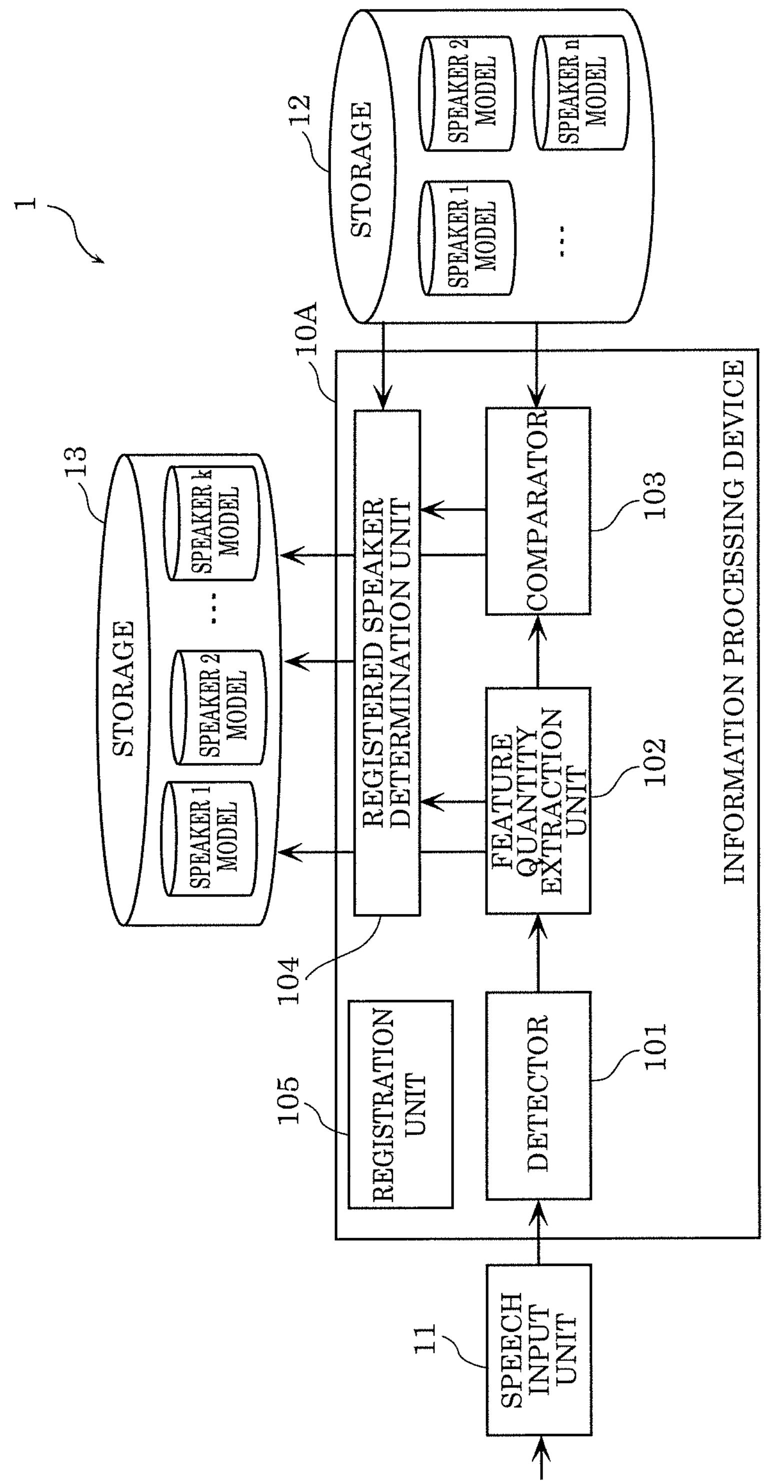
FIG. 8 is a block diagram illustrating a configuration example of a registered speaker estimation system according to Embodiment 2.

FIG. 8 is a block diagram illustrating a configuration example of registered speaker estimation system 1 according to Embodiment 2. The same reference symbols are assigned to the corresponding elements in FIGS. 2 and 8, and detailed explanations are omitted.

The configuration of information processing device 10A in registered speaker estimation system 1 in FIG. 8 differs from that of information processing device 10 in registered speaker estimation system 1 in Embodiment 1.

Information Processing Device 10A

Information processing device 10A is also a computer including, for example, a processor (microprocessor), memory, communication interfaces and chooses registered speakers to be identified. As illustrated in FIG. 8, information processing device 10A in Embodiment 2 includes detector 101, feature quantity extraction unit 102, comparator 103, registered speaker determination unit 104, and registration unit 105. As in the case of information processing device 10, information processing device 10A may further include storage 13 and storage 12. However, storage 13 and storage 12 are not essential elements.

Information processing device 10A in FIG. 8 includes registration unit 105 that information processing device 10 according to Embodiment 1 does not include. In this respect, information processing device 10A differs from information processing device 10.

Registration Unit 105

As the initial step performed by information processing device 10, registration unit 105 stores the second feature quantities of speaker models representing respective registered speakers in storage 13. More specifically, before registered speaker determination unit 14 starts operating, registration unit 105 instructs each of target speakers to be registered to utter first speech, which is input to speech input unit 11. Registration unit 105 then detects first speech segments from the respective first speech input to speech input unit 11, extracts, from the first speech segments, feature quantities identifying the respective target speakers, and stores the feature quantities in storage 13 as second feature quantities. It should be noted that registration unit 105 may perform the processing by controlling detector 101 and feature quantity extraction unit 102. That is, registration unit 105 may control detector 101 and cause detector 101 to detect the first speech segments from the respective first speech input to speech input unit 11. In addition, registration unit 105 may control feature quantity extraction unit 102 and cause feature quantity extraction unit 102 to extract, from the first speech segments detected by detector 101, the feature quantities identifying the respective target speakers. Registration unit 105 may store the feature quantities extracted by feature quantity extraction unit 102 in storage 13 as second feature quantities or may store, in storage 13, the feature quantities extracted by feature quantity extraction unit 102 as a result of control performed on feature quantity extraction unit 102, as second feature quantities.

It should be noted that when speech produced by a target speaker to be registered contains speech segments, as a second feature quantity, registration unit 105 may store, in storage 13, a feature quantity extracted from a speech segment in which the speech segments are combined or a feature quantity including feature quantities extracted from the respective speech segments.

Operation by Information Processing Device 10A

Next, operations performed by information processing device 10A having the above configuration are described.

Figure 9:
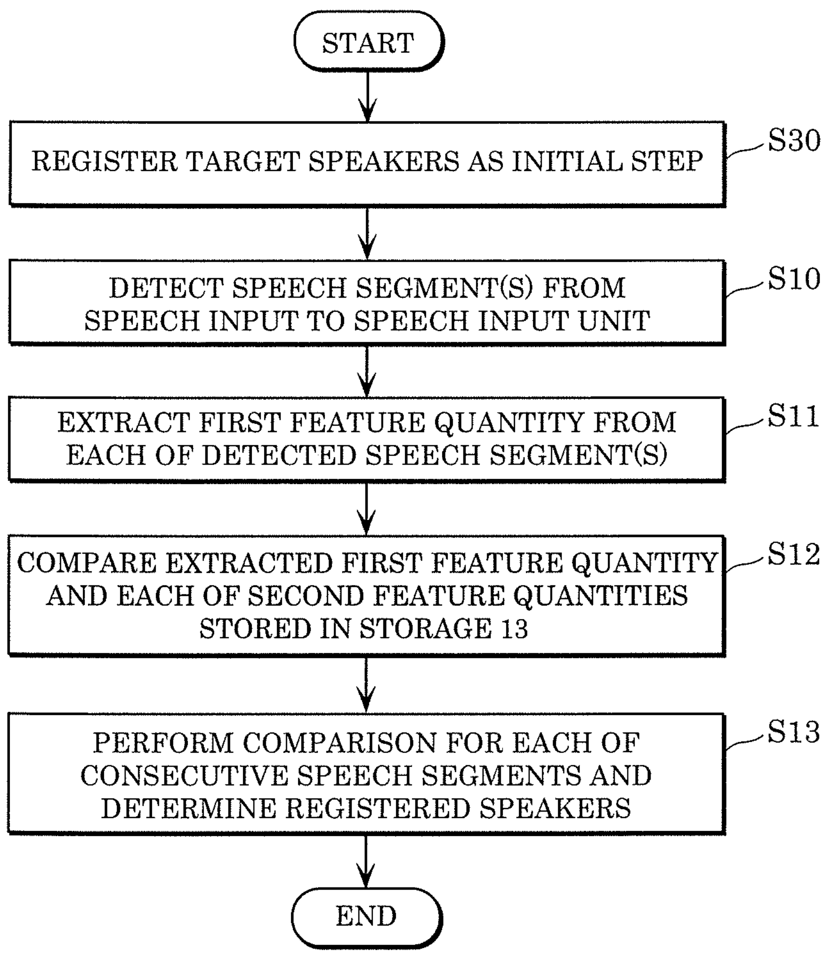
FIG. 9 is a flowchart illustrating the outline of operations performed by an information processing device according to Embodiment 2.

FIG. 9 is a flowchart illustrating the outline of the operations performed by information processing device 10A according to Embodiment 2. The same reference symbols are assigned to the corresponding steps in FIGS. 4 and 9, and detailed explanations are omitted.

First, information processing device 10A registers target speakers (S30). Specific processing is similar to preregistration illustrated in FIG. 7 except for that information processing device 10A performs registration as the initial step. Registration performed by information processing device 10A is described below with reference to FIG. 7. That is, each of target speakers, such as each participant in a meeting, is instructed to utter first speech, and the respective first speech is input to speech input unit 11 (S21). Then, registration unit 105 causes detector 101 to detect first speech segments from the respective first speech input to speech input unit 11 (S22). Registration unit 105 causes feature quantity extraction unit 102 to extract, from the first speech segments detected in step S22, feature quantities identifying the respective speakers who are the target speakers and have uttered the first speech (S23). As the final step, registration unit 105 stores the feature quantities extracted in step S23 by feature quantity extraction unit 102 in storage 13 as the second feature quantities of speaker models representing the respective target speakers (S24).

Thus, as the initial step, information processing device 10A registers the target speakers.

Since the subsequent steps S10 to S13 are already described above, explanations are omitted.

Figure 10:
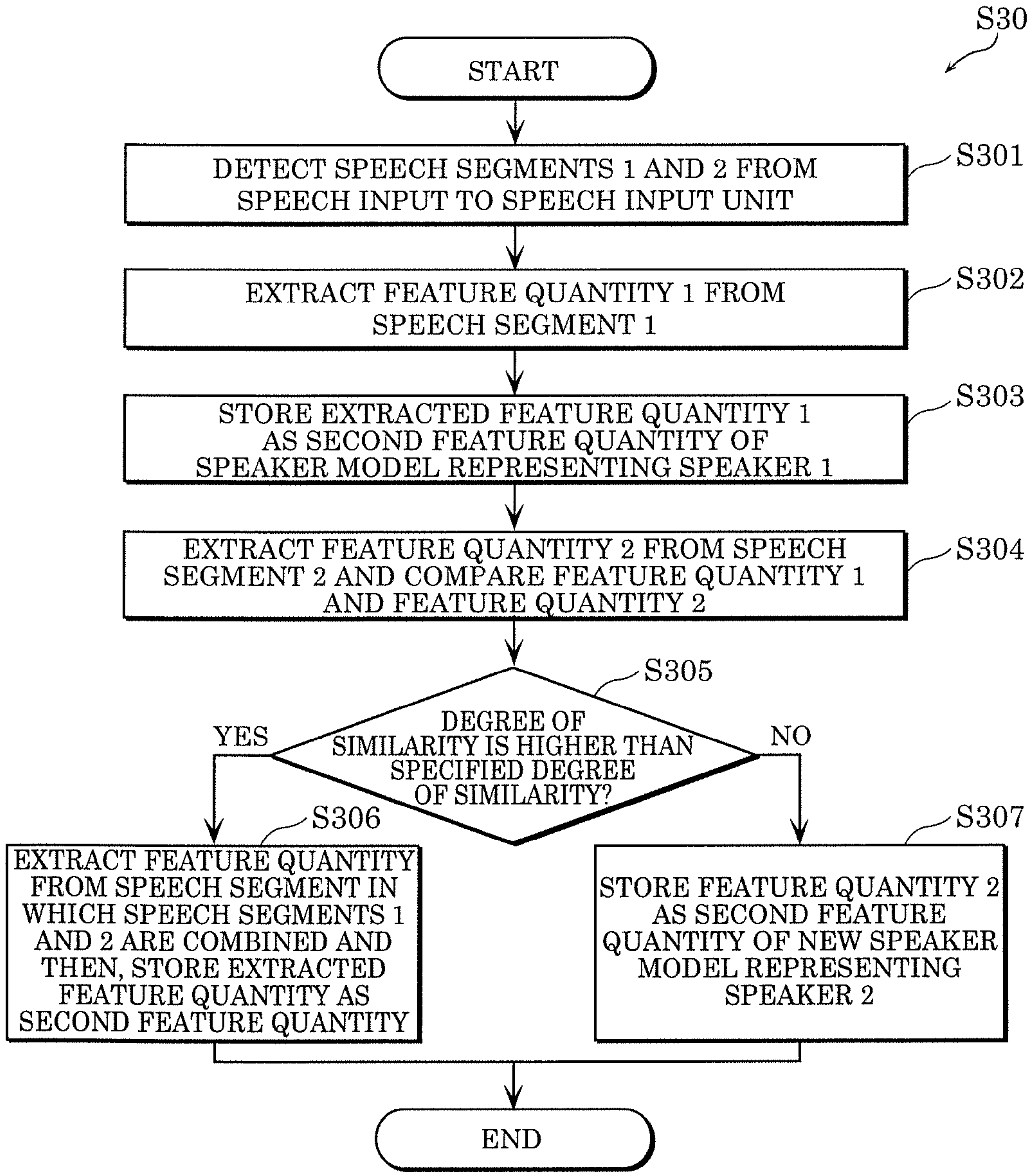
FIG. 10 is a flowchart illustrating a process in which specific operations in step S30 according to Embodiment 2 are performed.

Next, with reference to FIG. 10, an example of specific operations performed in step S30 is described.

Figure 11:
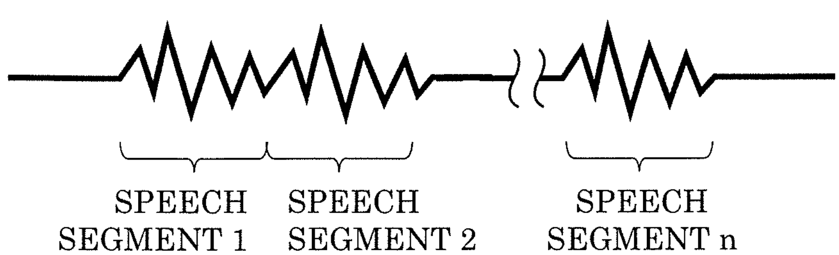
FIG. 11 illustrates an example of speech segments detected by the information processing device according to Embodiment 2.

FIG. 10 is a flowchart illustrating a process in which the specific operations in step S30 according to Embodiment 2 are performed. FIG. 11 is an example of speech segments detected by information processing device 10A according to Embodiment 2. With reference to FIG. 10, a case in which speaker 1 and speaker 2 are participants in a meeting is described.

In FIG. 10, speaker 1, a target speaker to be registered, is instructed to utter speech, and the speech is input to speech input unit 11.

Registration unit 105 causes detector 101 to detect speech segment 1 and speech segment 2 from speech input to speech input unit 11, the speech containing the speech uttered by speaker 1 (S301). It should be noted that, for example, as illustrated in FIG. 11, detector 11 detects, from a speech signal received from speech input unit 11, speech segment 1 and speech segment 2, which are obtained by evenly dividing the speech into portions.

Then, registration unit 105 causes feature quantity extraction unit 102 to extract, from speech segment 1 detected in step S301, feature quantity 1 identifying speaker 1 whose voice is contained in speech segment 1 (S302). Registration unit 105 stores extracted feature quantity 1 in storage 13 as the second feature quantity of the speaker model representing speaker 1 (S303).

Registration unit 105 causes feature quantity extraction unit 102 to extract, from speech segment 2 detected in step S301, feature quantity 2 identifying the speaker whose voice is contained in speech segment 2 and compares feature quantity 2 extracted and feature quantity 1 stored (S304).

Registration unit 105 determines whether a degree of similarity between feature quantity 1 and feature quantity 2 is higher than a specified degree of similarity (S305).

In step S305, when the degree of similarity is higher than the specified degree of similarity (threshold) (Yes in step S305), a feature quantity is extracted from a speech segment in which speech segment 1 and speech segment 2 are combined, and the extracted feature quantity is stored as a second feature quantity (S306). That is, when both speech segment 1 and speech segment 2 contain the voice of speaker 1, registration unit 105 updates feature quantity 1 stored in storage 13 to a feature quantity including feature quantity 1 and feature quantity 2. Thus, it is possible to more accurately identify speaker 1 by the second feature quantity of the speaker model representing speaker 1.

Meanwhile, in step S305, when the degree of similarity is less than or equal to the specified degree of similarity (threshold) (No in step S305), storage 13 stores feature quantity 2 as the second feature quantity of a new speaker model representing speaker 2 different from speaker 1 (S307). That is, if speech segment 2 contains the voice of speaker 2, registration unit 105 stores feature quantity 2 as the second feature quantity of the speaker model representing speaker 2. Thus, speaker 2, different from speaker 1, can be registered together with speaker 1.

Advantageous Effect, Etc.

As described above, by using, for example, information processing device 10A in Embodiment 2, before choosing registered speakers to be identified, it is possible to store the second feature quantities of speaker models representing respective registered speakers in storage 13. By using, for example, information processing device 10A in Embodiment 2, a conversation is evenly divided into segments, a voice feature quantity is extracted from each segment, and the comparison is then repeated. By doing so, it is possible to remove a speaker who does not have to be identified, resulting in improved accuracy of speaker recognition.

Thus, the users of information processing device 10A do not have to perform additional processing to preregister target speakers. Accordingly, it is possible to improve the accuracy of speaker recognition without placing burdens on the users.

Although the information processing devices according to Embodiments 1 and 2 are described above, embodiments of the present disclosure are not limited to Embodiments 1 and 2.

Typically, the processing units in the information processing device according to Embodiment 1 or 2 may be, for instance, fabricated as a large-scale integrated circuit (LSI), which is an integrated circuit (IC). These units may be individually fabricated as one chip, or a part or all of the units may be combined into one chip.

Circuit integration does not necessarily have to be realized by an LSI, but may be realized by a dedicated circuit or a general-purpose processor. A field-programmable gate array (FPGA), which can be programmed after manufacturing an LSI, may be used, or a reconfigurable processor, in which connection between circuit cells and the setting of circuit cells inside an LSI can be reconfigured, may be used.

In addition, the present disclosure may be realized as a speech-continuation determination method performed by an information processing device.

In each of Embodiments 1 and 2, the structural elements may be fabricated as dedicated hardware or may be caused to function by running a software program suitable for each structural element. Each structural element may be caused to function by a program running unit, such as a CPU or a processor, reading a software program recorded on a recording medium, such as a hard disk or semiconductor memory, and running the software program.

In addition, the separation of the functional blocks illustrated in each block diagram is a mere example. For instance, two or more functional blocks may be combined into one functional block. One functional block may be separated into two or more functional blocks. The functions of a functional block may be partially transferred to another functional block. Single hardware or software may process the functions of functional blocks having similar functions in parallel or in a time-sharing manner.

The order in which the steps illustrated in each flowchart are performed is a mere example to specifically explain the present disclosure, and other orders may be used. A step among the steps and another step may be performed concurrently (in parallel).

The information processing device(s) according to one or more than one embodiment is described above on the basis of Embodiments 1 and 2. However, the present disclosure is not limited to Embodiments 1 and 2. An embodiment or embodiments of the present disclosure may cover an embodiment obtained by making various changes that those skilled in the art would conceive to the embodiment(s) and an embodiment obtained by combining structural elements in the different embodiments unless the embodiments do not depart from the spirit of the present disclosure.

INDUSTRIAL APPLICABILITY

The present disclosure can be employed in an information processing method, an information processing device, and a recording medium. For instance, the present disclosure can be employed in an information processing method, an information processing device, and a recording medium that use a speaker recognition function for speech in a conversation, such as an AI speaker or a minutes recording system.

What is claimed is:

1. An information processing method performed by a computer, the information processing method comprising:

detecting at least one speech segment from speech utterances that are sequentially input to a speech input unit;

extracting, from each of the at least one speech segment, a first feature quantity identifying a speaker whose voice is contained in the speech segment;

performing a comparison between the first feature quantity extracted and each of second feature quantities stored in a second storage as targets in speaker recognition for identifying respective voices of registered speakers, the second feature quantities being among second feature quantities pre-stored in a first storage and identifying respective voices of registered speakers;

performing a parsing and management of the registered speakers in the second storage, based on results of the comparison, which is performed for each consecutive speech segment of the at least one speech segment, of:

deleting, from the second storage, at least one second feature quantity among the second features quantities when a degree of similarity between the first feature quantity in the consecutive speech segments, which is present for a fixed period of time or for a fixed number of times, and the at least one second feature quantity stored in the second storage is less than or equal to a threshold and a predetermined condition is satisfied, to remove at least one registered speaker identified by the at least one second feature quantity from the registered speakers stored in the second storage and reduce a total number of registered speakers as target speakers for speaker recognition; and when a first feature quantity having a degree of similarity between the first feature quantity and each of the second feature quantities stored in the second storage, which is less than or equal to a threshold, appears among first feature quantities in speech segments that follow the consecutive speech segments, storing, in the second storage, a second feature quantity having a degree of similarity between the first feature quantity that appeared among the first feature quantities and the second feature quantities stored in the first storage that is greater than a threshold, based on comparing the first feature quantity that appeared among the first features quantities and each of the second feature quantities stored in the first storage; and adding, to the second storage, the first feature quantity that appeared among the first feature quantities as a feature quantity identifying a voice of a new registered speaker when a degree of similarity between the first feature quantity that appeared among the first features quantities and each of the second feature quantities stored in the first storage is less than or equal to a threshold based on a result of comparing the first feature quantity that appeared among the first features quantities and each of the second feature quantities stored in the first storage, to increase the total number of registered speakers who are target speakers for speaker recognition.

2. The information processing method according to claim 1, wherein when the second feature quantities stored in the second storage include a second feature quantity having a degree of similarity higher than the threshold, the second feature quantity having a degree of similarity higher than the threshold is updated to a feature quantity including the first feature quantity and the second feature quantity having a degree of similarity higher than the threshold, to update information on a registered speaker identified by the second feature quantity having a degree of similarity higher than the threshold and stored in the second storage, the degree of similarity being a degree of similarity with the first feature quantity.

3. The information processing method according to claim 1, wherein the second storage pre-stores the second feature quantities.

4. The information processing method according to claim 1, further comprising:

registering target speakers by (i) instructing each of the target speakers to utter first speech and inputting the respective first speech to the speech input unit, (ii) detecting first speech segments from the respective first speech, (iii) extracting, from the first speech segments, feature quantities in speech identifying the respective target speakers, and (iv) storing the feature quantities in the second storage as the second feature quantities.

5. The information processing method according to claim 1, wherein as the predetermined condition, the comparison is performed a total of m times for the consecutive speech segments, where m is an integer greater than or equal to 2, and as a result of the comparison performed m times, when at least one second feature quantity having a degree of similarity less than or equal to the threshold is included, at least one registered speaker identified by the at least one second feature quantity is removed, the degree of similarity being a degree of similarity with the first feature quantity extracted in each of the consecutive speech segments.

6. The information processing method according to claim 1, wherein, as the predetermined condition, the comparison is performed for a predetermined period, and as a result of the comparison performed for the predetermined period, when at least one second feature quantity having a degree of similarity less than or equal to the threshold is included, at least one registered speaker identified by the at least one second feature quantity is removed, the degree of similarity being a degree of similarity with the first feature quantity.

7. The information processing method according to claim 1, wherein, when the second storage stores, as the second feature quantities, second feature quantities identifying two or more respective registered speakers who are target speakers in speaker recognition, at least one registered speaker identified by the at least one second feature quantity is removed.

8. The information processing method according to claim 1, wherein in the detecting, speech segments are detected consecutively in a time sequence from speech input to the speech input unit.

9. The information processing method according to claim 1, wherein in the detecting, speech segments are detected at predetermined intervals from speech input to the speech input unit.

10. An information processing device comprising:

a non-transitory computer-readable recording medium configured to store a program thereon; and a hardware processor configured to execute the program and cause the information processing device to:

detect at least one speech segment from speech utterances that are sequentially input;

extract, from each of the at least one speech segment, a first feature quantity identifying a speaker whose voice is contained in the speech segment;

perform a comparison between the first feature quantity extracted and each of second feature quantities stored in a second storage as targets in speaker recognition for identifying respective registered speakers, the second feature quantities being among second feature quantities pre-stored in a first storage and identifying respective voices of registered speakers;

perform a parsing and management of the registered speakers in the second storage, based on results of the compassion, which is performed for each consecutive speech segment of the at least one speech segment, and which includes to:

remove at least one registered speaker identified by at least one second feature quantity from the registered speakers stored in the second storage when a degree of similarity between the first feature quantity in the consecutive speech segments, which is present for a fixed period of time or for a fixed number of times, and the at least one second feature quantity stored in the second storage is less than or equal to a threshold and a predetermined condition is satisfied, to reduce a total number of registered speakers as target speakers for speaker recognition; and when a first feature quantity having a degree of similarity between the first feature quantity and each of the second feature quantities stored in the second storage, which is less than or equal to a threshold, appears among first feature quantities in speech segments that follow the consecutive speech segments, storing, in the second storage, a second feature quantity having a degree of similarity between the first feature quantity that appeared among the first feature quantities and the second feature quantities stored in the first storage that is greater than a threshold, based on comparing the first feature quantity that appeared among the first features quantities and each of the second feature quantities stored in the first storage; and add, to the second storage, the first feature quantity that appeared among the first feature quantities as a feature quantity identifying a voice of a new registered speaker when a degree of similarity between the first feature quantity and each of the second feature quantities stored in the storage is less than or equal to a threshold based on a result of comparing the first feature quantity that appeared among the first features quantities and each of the second feature quantities stored in the first storage, to increase a total number of registered speakers who are target speakers for speaker recognition.

11. A non-transitory computer-readable recording medium for use in a computer, the recording medium having a program recorded thereon for causing the computer to perform an information processing method, the information processing method comprising:

detecting at least one speech segment from speech utterances that are sequentially input to a speech input unit;

extracting, from each of the at least one speech segment, a first feature quantity identifying a speaker whose voice is contained in the speech segment;

performing a comparison between the first feature quantity extracted and each of second feature quantities stored in a second storage as targets in speaker recognition for identifying respective voices of registered speakers, the second feature quantities being among second feature quantities pre-stored in a first storage and identifying respective voices of registered speakers;

performing a parsing and management of the registered speakers in the second storage, based on results of the comparison, which is performed for each consecutive speech segment of the at least one speech segment, of:

deleting, from the second storage, at least one second feature quantity among the second features quantities when a degree of similarity between the first feature quantity in the consecutive speech segments, which is present for a fixed period of time or for a fixed number of times, and the at least one second feature quantity stored in the second storage is less than or equal to a threshold and a predetermined condition is satisfied, to remove at least one registered speaker identified by the at least one second feature quantity from the registered speakers stored in the second storage and reduce a total number of registered speakers as target speakers for speaker recognition; and when a first feature quantity having a degree of similarity between the first feature quantity and each of the second feature quantities stored in the second storage, which is less than or equal to a threshold, appears among first feature quantities in speech segments that follow the consecutive speech segments, storing, in the second storage, a second feature quantity having a degree of similarity between the first feature quantity that appeared among the first feature quantities and the second feature quantities stored in the first storage that is greater than a threshold, based on comparing the first feature quantity that appeared among the first features quantities and each of the second feature quantities stored in the first storage; and adding, to the second storage, the first feature quantity that appeared among the first feature quantities as a feature quantity identifying a voice of a new registered speaker when a degree of similarity between the first feature quantity that appeared among the first features quantities and each of the second feature quantities stored in the first storage is less than or equal to a threshold based on a result of comparing the first feature quantity that appeared among the first features quantities and each of the second feature quantities stored in the first storage, to increase the total number of registered speakers who are target speakers for speaker recognition.

* * * * *